US012397447B2

(12) United States Patent
Choi et al.

(10) Patent No.: US 12,397,447 B2
(45) Date of Patent: Aug. 26, 2025

(54) GRIP DEVICE AND ROBOT DEVICE COMPRISING SAME

(71) Applicant: SAMSUNG ELECTRONICS CO., LTD., Suwon-si (KR)

(72) Inventors: Heeseung Choi, Suwon-si (KR); Jinho Kim, Suwon-si (KR); Hyunwoo Kim, Suwon-si (KR); Cheoggyu Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 164 days.

(21) Appl. No.: 18/074,018

(22) Filed: Dec. 2, 2022

(65) Prior Publication Data

US 2023/0102104 A1  Mar. 30, 2023

Related U.S. Application Data

(63) Continuation of application No. PCT/KR2021/008350, filed on Jul. 1, 2021.

(30) Foreign Application Priority Data

Jul. 24, 2020 (KR) .................. 10-2020-0092103

(51) Int. Cl.
 *B25J 15/02* (2006.01)
 *B25J 9/16* (2006.01)
 *B25J 13/08* (2006.01)

(52) U.S. Cl.
 CPC ......... *B25J 15/0266* (2013.01); *B25J 9/1612* (2013.01); *B25J 13/08* (2013.01)

(58) Field of Classification Search
 CPC .... B25J 15/0266; B25J 15/028; B25J 9/1612; B25J 9/1694; B25J 9/102; B25J 9/126;
 (Continued)

(56) References Cited

U.S. PATENT DOCUMENTS 2,783,078 A * 2/1957 Billner .................. B66C 1/0243
 414/606
3,306,646 A * 2/1967 Flora, Jr. ................. B66C 1/427
 294/81.61
(Continued)

FOREIGN PATENT DOCUMENTS

CN 202506766 U 10/2012
CN 107717978 A 2/2018
(Continued)

OTHER PUBLICATIONS

Kosuge et al., "A Novel Grasping Mechanism for Flat-shaped Objects Inspired by Lateral Grasp," Proceedings of the 2nd Biennial IEEE/RAS-EMBS International Conference on Biomedical Robotics and Biomechatronics, Scottsdale, AZ, USA, Oct. 19-22, 2008, pp. 282-288, 2008.

(Continued)

*Primary Examiner* — Stephen A Vu
(74) *Attorney, Agent, or Firm* — Sughrue Mion, PLLC

(57) ABSTRACT

A grip device is provided. A grip device according to an embodiment of the present disclosure includes: a first finger; a second finger facing the first finger; a first link part including a first guide slot and supporting the first finger; a second link part supporting the second finger and including a second guide slot, intersecting the first link part; a hinge configured to move inside the first guide slot and second guide slot and connecting the first link part and the second link part at an intersection point of the first link part and second link part; a first actuator configured to adjust a distance between the first finger and second finger by moving the first link part and/or the second link part; and a second actuator configured to move the hinge inside the first guide slot and second guide slot.

9 Claims, 12 Drawing Sheets

(58) Field of Classification Search
CPC ........ B25J 13/08; B25J 13/082; B25J 13/086; B25J 19/023; G05B 2219/39543
See application file for complete search history.

(56) References Cited

U.S. PATENT DOCUMENTS

| | | | |
|---|---|---|---|
| 3,861,732 A * | 1/1975 | Piper | B66C 1/0293 294/67.4 |
| 4,723,353 A * | 2/1988 | Monforte | B25J 15/0052 414/737 |
| 5,280,982 A * | 1/1994 | Kobayashi | B66C 1/54 294/116 |
| 7,776,065 B2 | 8/2010 | Griffiths et al. | |
| 8,167,345 B2 | 5/2012 | Shibamoto et al. | |
| 8,260,458 B2 | 9/2012 | Kim et al. | |
| 8,276,957 B2 | 10/2012 | Shibamoto et al. | |
| 8,651,796 B2 | 2/2014 | Hosek et al. | |
| 8,979,152 B2 | 3/2015 | Ciocarlie et al. | |
| 10,059,007 B1 | 8/2018 | O'Connor et al. | |
| 10,543,596 B2 | 1/2020 | Hosek et al. | |
| 2008/0147090 A1 | 6/2008 | Seibold et al. | |
| 2009/0261609 A1 | 10/2009 | Shibamoto et al. | |
| 2009/0285664 A1 | 11/2009 | Kim et al. | |
| 2011/0270416 A1 | 11/2011 | Lee et al. | |
| 2012/0153655 A1 | 6/2012 | Shibamoto et al. | |
| 2017/0057096 A1 | 3/2017 | Saadat | |
| 2019/0284886 A1 | 9/2019 | Soyland | |
| 2019/0366561 A1 | 12/2019 | Zhang et al. | |

FOREIGN PATENT DOCUMENTS

| | | |
|---|---|---|
| CN | 207290149 U | 5/2018 |
| CN | 207402794 U | 5/2018 |
| CN | 207465232 U | 6/2018 |
| CN | 109693257 A | 4/2019 |
| CN | 110202605 A | 9/2019 |
| JP | 7-35892 A | 2/1995 |
| KR | 10-2009-0118153 A | 11/2009 |
| KR | 10-1536117 B1 | 7/2015 |
| KR | 10-1561158 B1 | 10/2015 |
| KR | 10-2020-0081303 A | 7/2020 |

OTHER PUBLICATIONS

Ruotolo et al., "Distal Hyperextension is Handy: High Range of Motion in Cluttered Environments," IEEE Robotics and Automation Letters, Preprint Version, Jan. 2020, Total 8 pages.

Kim et al., "Fluid Lubricated Dexterous Finger Mechanism for Human-Like Impact Absorbing Capability," IEEE Robotics and Automation Letters, vol. 4, No. 4, pp. 3971-3978, Oct. 2019.

Communication dated Oct. 18, 2021, issued by the International Searching Authority in counterpart International Application No. PCT/KR2021/008350 (PCT/ISA/210).

Communication dated Oct. 18, 2021, issued by the International Searching Authority in counterpart International Application No. PCT/KR2021/008350 (PCT/ISA/237).

Communication issued Sep. 22, 2023 by the European Patent Office in counterpart European Patent Application No. 21847188.6.

Communication issued Jan. 2, 2024 by the European Patent Office in European Patent Application No. 21847188.6.

Communication issued May 21, 2025 by the Korean Intellectual Property Office in Korean Patent Application No. 10-2020-0092103.

Communication issued May 31, 2025 by the National Intellectual Property Administration, PRC in Chinese Patent Application No. 202180059389.5.

* cited by examiner

GRIP DEVICE AND ROBOT DEVICE COMPRISING SAME

CROSS-REFERENCE TO THE RELATED APPLICATIONS

This application is a bypass continuation of International Application No. PCT/KR2021/008350, filed on Jul. 1, 2021, in the Korean Patent Office, which claims priority from Korean Application No. 10-2020-0092103, filed on Jul. 24, 2020, in the Korean Patent Office, the contents of which are herein incorporated by reference in their entireties.

BACKGROUND

1. Technical Field

Embodiments of the disclosure relate to a grip device and a robot device including the same, and more particularly, to a grip device having an improved structure in which a hinge functioning as a support point is moved to obtain a force transmission ratio suitable to grip an object, and a robot device including the same.

2. Background Art

With the development of electronic technology, various types of electronic devices have been developed. In particular, various types of robot devices for performing tasks in place of humans at industrial sites or in the fields of medical treatment, space, housework, etc. have recently been developed. Such a robot device may include a grip device to perform various tasks such as gripping an object, assembly, transfer, welding, etc.

It is important to obtain a large grip force while reducing a gap between the fingers of the grip device in order for the grip device to grip a flat object such as a dish. On the contrary, it is important to obtain a small grip force while increasing a gap between the fingers of the grip device in order for the grip device to grip a tall object such as a cup.

However, a grip device of the related art performs a grip operation uniformly regardless of the shape of an object to be gripped and thus is driven in an inefficient manner. In addition, a driving speed of a grip device using a gear method or a screw rotation method is low.

SUMMARY

To address the above-described problems, embodiments of the disclosure provide a grip device having an improved structure in which a hinge functioning as a support point is moved to obtain a force transmission rate suitable to grip an object, and a robot device including the same.

According to embodiments of the disclosure, a grip device is provided. The grip device may include: a first finger; a second finger facing the first finger; a first link part including a first guide slot and configured to support the first finger; a second link part including a second guide slot, the second link part crossing the first link part and configured to support the second finger; a hinge configured to be moved within the first guide slot and the second guide slot and connect the first link part and the second link part at an intersection of the first link part and the second link part; a first actuator configured to move at least one of the first and the second link part to adjust a gap between the first finger and the second finger; and a second actuator configured to move the hinge within the first guide slot and the second guide slot.

According to an embodiment of the disclosure, the first link part may further include: a first linkage connected to a first point on the first finger; a second linkage connected to a second point on the first finger; and a third linkage connected to the second linkage and provided in parallel with the first finger, the second link part may further include: a fourth linkage connected to a first point on the second finger; a fifth linkage connected to a second point on the second finger and provided in parallel with the fourth linkage; and a sixth linkage connected to the fifth linkage and provided in parallel with the second finger, and the first guide slot is formed in the second linkage, and the second guide slot is formed in the fifth linkage.

According to an embodiment of the disclosure, a length of the third linkage may be equal to a distance between the first point and the second point on the first finger, and a length of the sixth linkage may be equal to a distance between the first point and the second point on the second finger.

According to an embodiment of the disclosure, the first actuator may be configured to adjust a gap between the third linkage and the sixth linkage.

According to an embodiment of the disclosure, the first actuator may include: a first driving motor configured to move the third linkage in a first direction; and a second driving motor configured to move the sixth linkage in a second direction opposite to the first direction.

According to an embodiment of the disclosure, the second actuator may include a driving motor configured to move the hinge within the first guide slot and the second guide slot.

According to an embodiment of the disclosure, the second actuator may include: a first driving motor provided on the second linkage and configured to move the hinge along the first guide slot; and a second driving motor provided on the fifth linkage and configured to move the hinge along the second guide slot.

According to an embodiment of the disclosure, each of the first driving motor and the second driving motor may include a Scotch yoke type driving motor, a rack and pinion type driving motor, or a hydraulic type driving motor.

According to an embodiment of the disclosure, the second linkage and the fifth linkage may each have a convex shape with respect to a space between the first finger and the second finger.

According to embodiments of the disclosure, a robot device is provided. The robot device may include: an image sensor configured to detect at least one of a shape and position of an object; a grip device including a link part, the grip device configured to adjust a support point of the link part by moving a hinge on the link part, wherein the link part is cross-arranged with respect to a first finger of the grip device, a second finger of the grip device, and the hinge, and the link part is configured to support the first finger and the second finger; and a processor configured to control the grip device to position the hinge to correspond to the object detected by the image sensor.

According to an embodiment of the disclosure, the link part may include: a first link part including a first guide slot and configured to support the first finger; and a second link part including a second guide slot, the second link part crossing the first link part and configured to support the second finger, the hinge may be movable within the first guide slot and the second guide slot and may connect the first link part and the second link part at an intersection of the first link part and the second link part, and the grip device may further include an actuator configured to move the hinge within the first guide slot and the second guide slot.

According to an embodiment of the disclosure, the actuator may include a connection member which is connected to the hinge and is variable in length, and the processor may be configured to determine a target length of the connection member according to at least one of the shape and position of the object detected by the image sensor, and control the actuator to cause a length of the connection member to be equal to the target length that is determined.

According to an embodiment of the disclosure, the robot device may further include a pressure sensor configured to measure pressure applied to at least one of the first finger and the second finger, and wherein the processor may be configured to control a grip operation of the grip device based on a value measured by the pressure sensor.

According to an embodiment of the disclosure, the robot device may further include: a first distance sensor on the first finger; and a second distance sensor on the second finger, and wherein the processor may be further configured to: activate the second distance sensor based on the first distance sensor detecting the object during movement of the robot device; receive information about distances to the object detected by the first distance sensor and the second distance sensor at a plurality of points according to the movement of the robot device; and control a grip operation of the grip device based on the information that is received.

According to embodiments of the disclosure, a method of operating a robot device is provided. The method may include: detecting, by an image sensor of the robot device, at least one of a shape and position of an object; and controlling, by at least one processor of the robot device, a grip device of the robot device to position a hinge on a link part of the grip device to correspond to the object detected by the image sensor, wherein the grip device may be configured to adjust a support point of the link part by moving the hinge on the link part, wherein the link part may be cross-arranged with respect to a first finger of the grip device, a second finger of the grip device, and the hinge, and the link part may be configured to support the first finger and the second finger.

According to an embodiment of the disclosure, the link part may include: a first link part including a first guide slot and configured to support the first finger; and a second link part including a second guide slot, the second link part crossing the first link part and configured to support the second finger, wherein the controlling the grip device may include controlling an actuator of the robot device to move the hinge within the first guide slot and the second guide slot, and wherein the hinge may connect the first link part and the second link part at an intersection of the first link part and the second link part.

According to an embodiment of the disclosure, the actuator may include a connection member which is connected to the hinge and is variable in length, and the controlling the grip device may further include determining a target length of the connection member according to at least one of the shape and position of the object detected by the image sensor, and controlling the actuator to cause a length of the connection member to be equal to the target length that is determined.

According to an embodiment of the disclosure, the controlling the grip device may include controlling, by the at least one processor, a grip operation of the grip device based on a value measured by a pressure sensor of the robot device, and the pressure sensor may be configured to measure pressure applied to at least one of the first finger and the second finger.

According to an embodiment of the disclosure, the method may further include: activating, by the at least one processor, a second distance sensor, on the second finger, based on a first distance sensor, on the first finger, detecting the object during movement of the robot device; and receiving information about distances to the object detected by the first distance sensor and the second distance sensor at a plurality of points according to the movement of the robot device, wherein controlling the grip device may include controlling a grip operation of the grip device based on the information that is received.

According to an embodiment of the disclosure, the controlling the grip operation may include controlling the grip operation based on a comparison of a difference, between a distance between the first distance sensor and the object and a distance between the second distance sensor and the object, and a threshold value.

DETAILED DESCRIPTION

Figure 1:
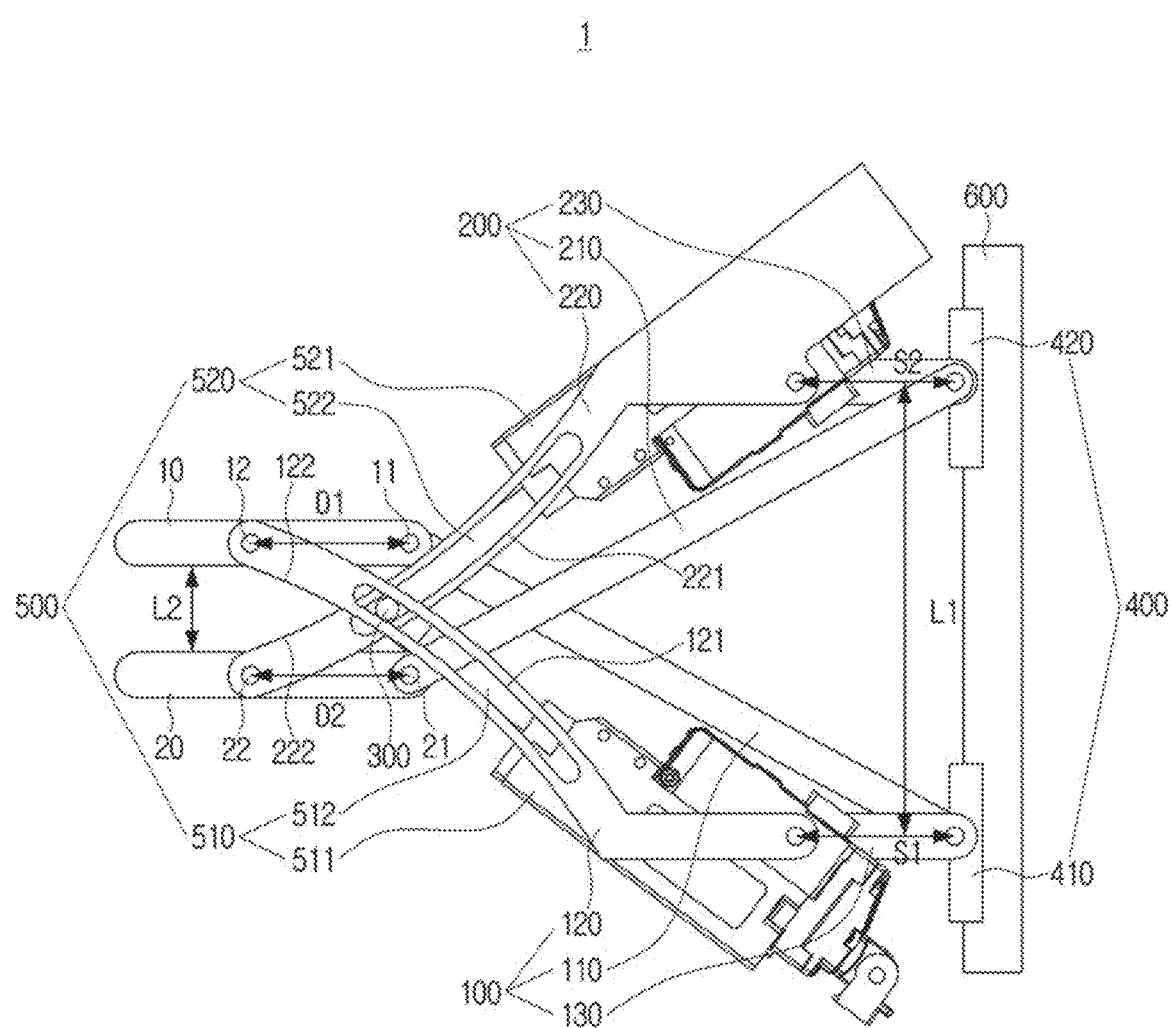
FIG. 1 is a side view of a grip device according to an embodiment of the disclosure.

Embodiments described below are provided as non-limiting examples to help understand the disclosure, and it should be understood that embodiments of the disclosure may be implemented in various forms different from these embodiments. In the following description of the disclosure, related well-known functions or components are not described in detail and are not illustrated in the drawings when it is determined that they would obscure the subject matter of the disclosure due to unnecessary detail. In the accompanying drawings, components are not shown in actual scale and the sizes of some components may be exaggerated to help understand the disclosure.

In the present specification and the claims, general terms are selected in consideration of the functions of the disclosure. However, non-general terms may be selected according to the intention of the technician in the art, legal or technical interpretation, the emergence of new technologies, etc. Some terms may be arbitrarily selected by the applicant. These terms may be interpreted as defined in the present specification, and may be interpreted based on the overall content of the present specification and the common technical knowledge in the technical field concerned when the terms are not specifically defined herein.

As used herein, expressions such as "have", "may have," "include" or "may include" are intended to indicate the presence of features (e. g., a numerical value, a function, an operation, a component of a machine part, etc.) and do not exclude the presence of additional features.

While the present specification describes components for describing example embodiments of the disclosure, the disclosure is not necessarily limited thereto. Accordingly, some components may be changed or omitted and other components may be added. In addition, components may be distributed and disposed in different independent devices.

Although example embodiments of the disclosure will be described in detail herein with reference to the accompanying drawings and the content shown in the accompanying drawings, the disclosure is not limited to or limited by the example embodiments.

Hereinafter, embodiments of the disclosure will be described in more detail with reference to the accompanying drawings.

FIG. 1 is a side view of a grip device according to an embodiment of the disclosure.

Referring to FIG. 1, a grip device 1 according to an embodiment of the disclosure may include a first finger 10, a second finger 20, a first link part 100, a second link part 200, a hinge 300, a first actuator 400, a second actuator 500, and a support 600.

The first finger 10 and the second finger 20 are disposed to face each other and are spaced a certain distance from each other to form a space for disposing therein an object to be gripped.

The first finger 10 and the second finger 20 may be driven by the first actuator 400 and the second actuator 500, which will be described below, and a gap L2 between the first finger 10 and the second finger 20 may be adjusted by a driving force transmitted by the first link part 100 and the second link part 200.

The first link part 100 may be provided with a first guide slot 121 and may support the first finger 10. The second link part 200 may be provided with a second guide slot 221 and may support the second finger 20.

Each of the first link part 100 and the second link part 200 may have a four-bar linkage structure. Specifically, each of the first link part 100 and the second link part 200 may include three linkages connected to one another in sequence, and a total of four contact points among the three linkages and the first finger 10 or the second finger 20 are connected to form a closed-loop shape.

However, the first link part 100 and the second link part 200 are not limited to the above-described structure and may be each embodied as single link. For example, a single linkage of the first link part 100 and a single linkage of the second link part 200 may support the first finger 10 and the second finger 20 while being cross-connected with each other.

The hinge 300 is movable within the first guide slot 121 and the second guide slot 221 and may connect the first link part 100 and the second link part 200 at an intersection of the first link part 100 and the second link part 200.

The hinge 300 may function as a support point of the first link part 100 and the second link part 200. That is, the first link part 100 and the second link part 200 may rotate around the hinge 300 as a support point, thereby performing a grip operation.

Because the hinge 300 is movable within the first guide slot 121 and the second guide slot 221, a position of the hinge 30 may be changed to be close to or away from an object to be gripped.

Thus, in order to grip an object to be gripped with a large grip force, the hinge 300 may be disposed close to the object to increase a force transmission ratio and thus the object may be effectively gripped with a small driving force. In contrast, in order to grip an object to be gripped with a small grip force, the hinge 300 may be disposed away from the object to reduce a force transmission ratio and thus the object may be easily gripped with the same driving force without changing the intensity of the driving force.

The first actuator 400 may move at least one of the first link part 100 and the second link part 200 to adjust a gap L2 between the first finger 10 and the second finger 20. The first actuator 400 may adjust a gap L1 between a third linkage 130 and a sixth linkage 230 to be described below.

Specifically, because the first actuator 400 increases or decreases the gap L1 between one end of the first link part 100 and one end of the second link part 200 and the first link part 100 and the second link part 200 rotate around the hinge 300, the gap L2 between the first finger 10 and the second finger 20 respectively supported by the first link part 100 and the second link part 200 may also increase or decrease.

When the grip device 1 performs the grip operation, the first actuator 400 may move one end of the first link part 100 upward and one end of the second link part 200 downward. Thus, the first link part 100 may rotate counterclockwise around the hinge 300, and the second link part 200 may rotate clockwise around the hinge 300. As the first link part 100 and the second link part 200 rotate, the first finger 10 and the second finger 20 may be moved close to each other to pressurize and grip an object therebetween.

Conversely, when the grip device 1 performs a drop operation, the first actuator 400 may move one end of the first link part 100 downward and one end of the second link part 200 upward. Thus, the first link part 100 may rotate clockwise around the hinge 300, and the second link part 200 may rotate counterclockwise around the hinge 300. As the first link part 100 and the second link part 200 rotate, the first finger 10 and the second finger 20 may be moved away from each other to drop an object therebetween.

The first actuator 400 may include a first driving motor 410 configured to move the third linkage 130 of the first link part 100 in a first direction and a second driving motor 420 configured to move the sixth linkage 230 of the second link part 200 in a second direction opposite to the first direction. The first driving motor 410 and the second driving motor 420 may be linear motors but are not limited thereto and the type of the first driving motor 410 and the second driving motor 420 is not limited as long as they are capable of moving the third linkage 130 and the sixth linkage 230.

That is, as the first driving motor 410 (e.g., a linear motor) and the second driving motor 420 (e.g., a linear motor) move the third linkage 130 and the sixth linkage 230 in opposite directions, the first finger 10 and the second finger 20 may perform the grip operation or the drop operation.

Although the first actuator 400 is illustrated as including the first driving motor 410 to move the first link part 100 and the second driving motor 420 to move the second link part 200, the first actuator 400 is not limited thereto. For example, the first actuator 400 may include only the first linear motor 410 and one end of the second link part 200 may be fixed on the support 600, so that the grip operation and the drop operation may be smoothly performed by moving only the first link part 100.

The second actuator 500 may move the hinge 300 within the first guide slot 121 and the second guide slot 221. Specifically, the second actuator 500 may include only a third driving motor 510 to move the hinge 300 or may include both the third driving motor 510 and a fourth driving motor 520 to move the hinge 300.

The third driving motor 510 may include a main body 511 and a connection member 512. One end of the connection member 512 of the third driving motor 510 may be connected to the hinge 300 and a length of the connection member 512 may be variable.

Specifically, the length of the connection member 512 may be changed to be away from or close to the main body 511 and thus the hinge 300 connected to the connection member 512 may be moved along the first guide slot 121 and the second guide slot 221.

Although the third driving motor 510 is illustrated as being disposed on a second linkage 120 of the first link part 100, embodiments are not limited thereto and the main body 511 may be fixed on the support 600 at the same height as the hinge 300 to move the hinge 300 forward or backward.

The fourth driving motor 520 may have the same structure as the third driving motor 510 described above. That is, the fourth driving motor 520 may include a main body 521 and a connection member 522, one end of the connection member 522 may be connected to the hinge 300, and a length of the connection member 522 may be variable to be away from or close to the main body 521.

The third driving motor 510 may be disposed on the second linkage 120 of the first link part 100 to move the hinge 300 along the first guide slot 121. The fourth driving motor 520 may be disposed on a fifth linkage 220 of the second link part 200 to move the hinge 300 along the second guide slot 221.

The connection member 512 of the third driving motor 510 and the connection member 522 of the fourth driving motor 520 may be moved to have the same length or different lengths. Accordingly, the hinge 300 may be moved not only forward or backward but also upward or downward, and an area to be gripped by the grip device 1 may be expanded. This will be described in detail with reference to FIGS. 3 and 4 below.

The third driving motor 510 and the fourth driving motor 520 may be linear motors each having a variable length, and may be embodied as a scotch yoke type, a rack and pinion type, or a hydraulic type but are not limited thereto.

Hereinafter, the structures of the first link part 100 and the second link part 200 will be described in more detail.

The first link part 100 may include a first linkage 110 connected to a first point 11 on the first finger 10, a second linkage 120 connected to a second point 12 on the first finger 10 and disposed in parallel with the first linkage 110, and a third linkage 130 connected to the second linkage 120 and disposed in parallel with the first finger 10.

The second link part 200 may include a fourth linkage 210 connected to a first point 21 on the second finger 20, a fifth linkage 220 connected to a second point 22 on the second finger 20 and disposed in parallel with the fourth linkage 210, and a sixth linkage 230 connected to the fifth linkage 220 and disposed in parallel with the second finger 20.

The third linkage 130 and the sixth linkage 230 may maintain a horizontal shape even when the first link part 100 and the second link part 200 rotate. The first guide slot 121 may be formed in the second linkage 120, and the second guide slot 221 may be formed in the fifth linkage 220.

The third linkage 130 may have a length S1 equal to a distance D1 between the first point 11 and the second point 12 on the first finger 10. The sixth linkage 230 may have a length S2 equal to a distance between the first point 21 and the second point 22 on the second finger 20.

As the first linkage 110, the second linkage 120, and the third linkage 130 have the above-described structure, a region of each of the first linkage 110, the second linkage 120, and the third linkage 130 and the first finger 10 has a shape substantially the same as a parallelogram and thus the first finger 10 may maintain a horizontal shape.

Likewise, as the fourth linkage 210, the fifth linkage 220, and the sixth linkage 230 have the above-described structure, a region of each of the fourth linkage 210, the fifth linkage 220, and the sixth linkage 230 and the second finger 20 has a shape substantially the same as a parallelogram and thus the second finger 20 may maintain a horizontal shape.

That is, the grip device 1 according to an embodiment of the disclosure has a structure in which a four-bar linkage having a shape of a parallelogram supports the first finger 10 and the second finger 20 symmetrically and thus the first finger 10 and the second finger 20 are capable of gripping objects stably while maintaining a horizontal state.

The second linkage 120 and the fifth linkage 220 may have a convex shape with respect to a space between the first finger 10 and the second finger 20. That is, a region of each of the second linkage 120 and the fifth linkage 220 may have a convex shape when viewed backward from a space between the first finger 10 and the second finger 20 in which an object to be gripped is placed.

Accordingly, the space between the first finger 10 and the second finger 20 increase and thus even a bulky object may be easily gripped. When the grip operation is performed, an object may be easily gripped while minimizing interference between the object to be gripped and the first link part 100 and the second link part 200.

The support 600 may be an arm or a body part of a robot, and may support the first actuator 400 and provide a path in which the first actuator 400 moves. Although the support 600 is illustrated as having a vertical shape, the support 600 is not limited thereto.

FIG. 1 illustrates an example in which in the grip device 1, the connection member 512 of the third driving motor 510 and the connection member 522 of the fourth driving motor 520 are moved to increase a length thereof, so that the hinge 300 may be disposed close to an object to be gripped.

In order to grip a flat object (e.g., a dish) by the grip device 1, a narrow gap L2 between the first finger 10 and the second finger 20 and a large grip force may be used to grip the flat object. Therefore, as shown in FIG. 1, by moving the hinge 300 close to the flat object by the third driving motor motors 510 and the fourth driving motor 520, the flat object may be easily gripped with a high force transmission ratio while reducing the gap L2 between the first finger 10 and the second finger 20.

Figure 2:
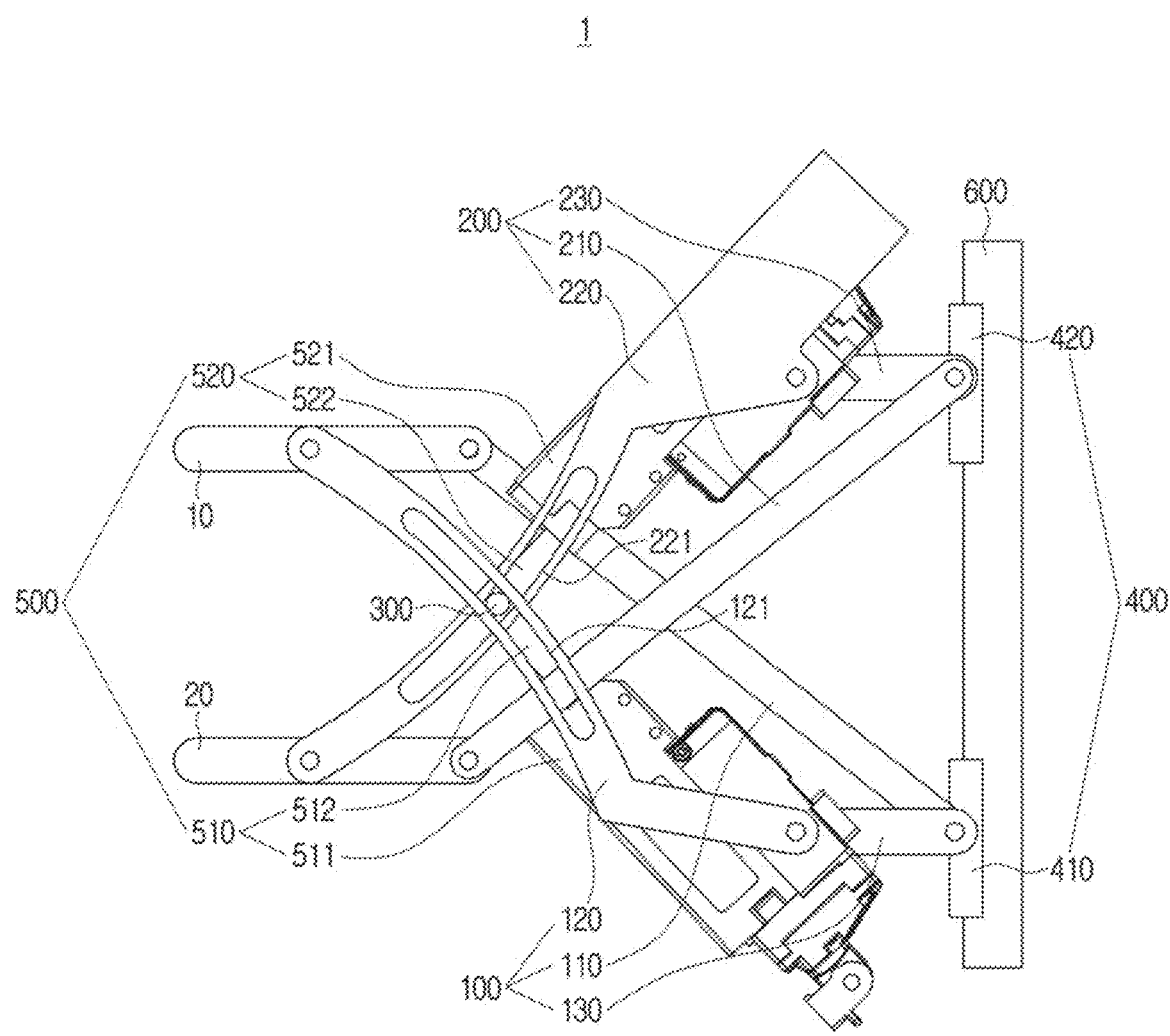
FIG. 2 is a side view of the grip device of FIG. 1 in which a hinge is moved backward.

FIG. 2 is a side view of a state in which the hinge 300 of FIG. 1 is moved backward.

Referring to FIG. 2, as the connection member 512 of the third driving motor 510 and the connection member 522 of the fourth driving motor 520 are moved to reduce the length thereof, compared to FIG. 1, the hinge 300 may also be moved away from an object to be gripped.

In order to grip a tall object (e. g., a cup) by the grip device 1, a large gap L2 between the first finger 10 and the second finger 20 and a low grip force may be used to grip the object. Therefore, as shown in FIG. 2, by moving the hinge 300 away from the tall object by the third driving motor 510 and the fourth driving motor 520, the object may also be easily gripped with a low force transmission ratio while increasing the gap L2 between the first finger 10 and the second finger 20.

That is, the grip device 1 according to an embodiment of the disclosure is capable of griping various types of objects by using the most effective structure by changing the gap L2 between the first finger 10 and the second finger 20 and the force transmission ratio by moving the hinge 300, which functions as a support point, close to or away from the object, even when the same driving source is used.

Figure 3:
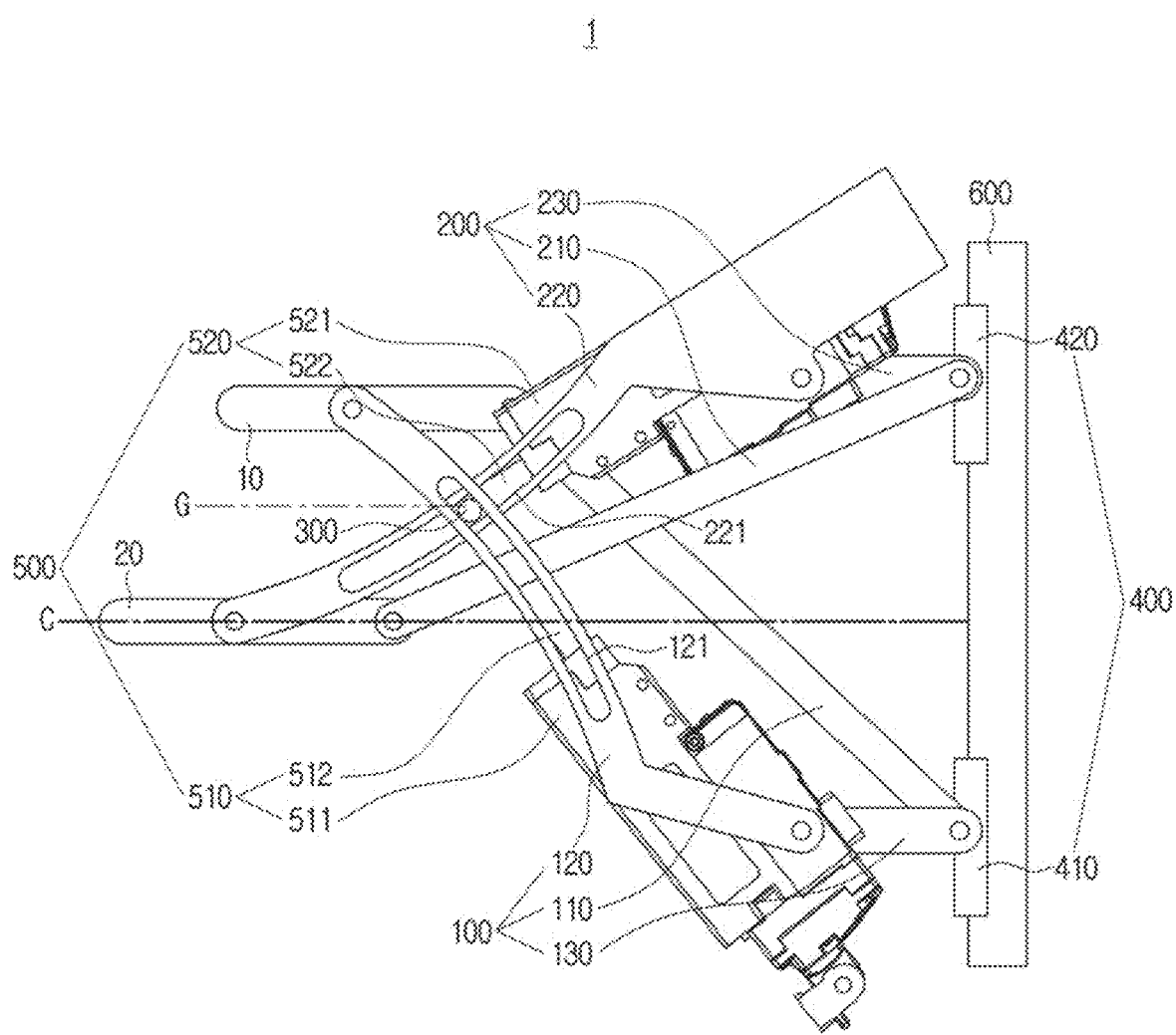
FIG. 3 is a side view of a grip device in which lengths of a third driving motor and a fourth driving motor are different from each other.
Figure 4:
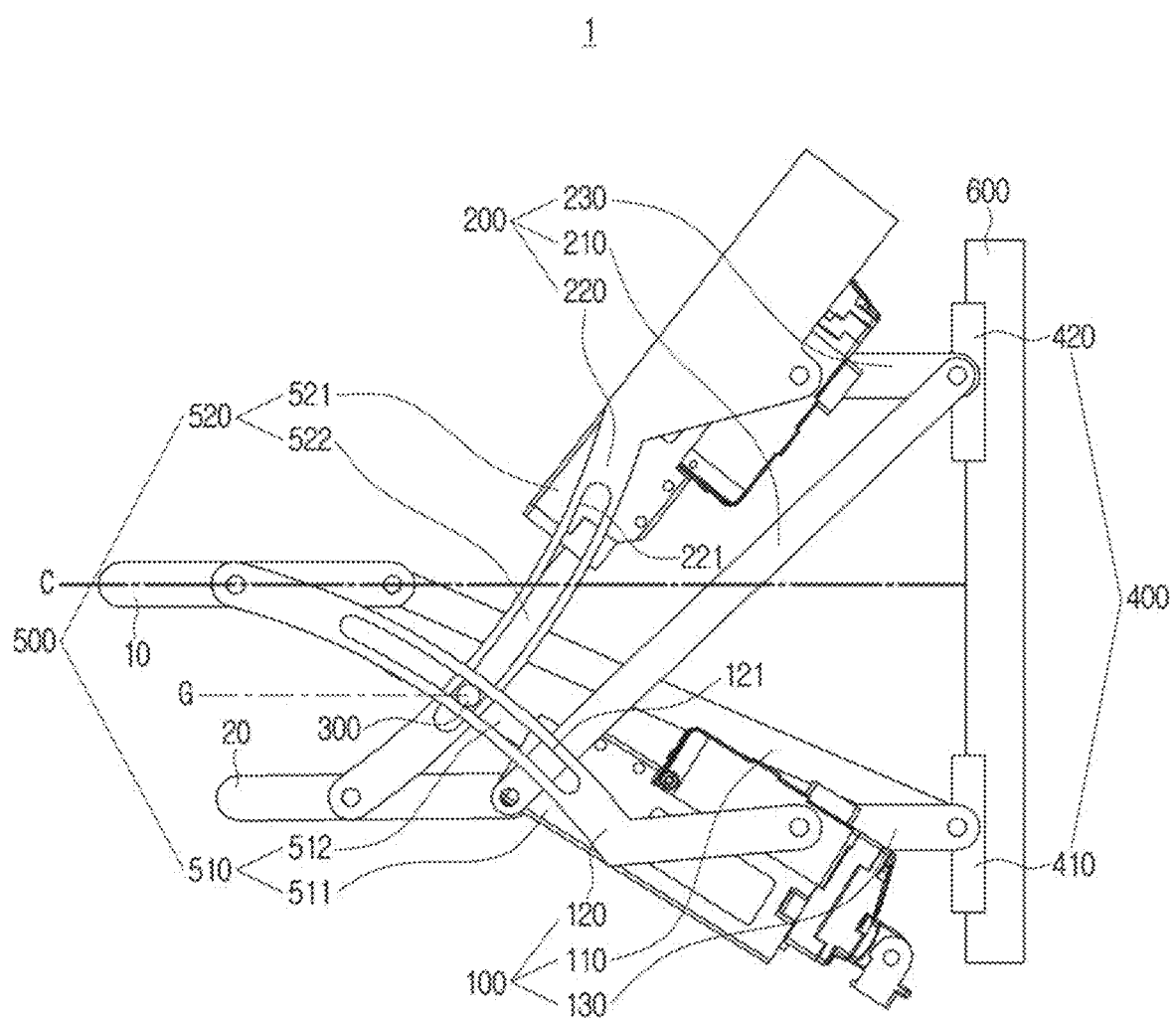
FIG. 4 is a side view of a grip device in which lengths of a third driving motor and a fourth driving motor are different from each other.

FIGS. 3 and 4 are side views of a state in which lengths of the third driving motor 510 and the fourth driving motor 520 are different from each other.

FIG. 3 illustrates an example in which the connection member 512 of the third driving motor 510 is longer than the connection member 522 of the fourth driving motor 520 and thus the hinge 300 is moved upward. In contrast, FIG. 4 illustrates an example in which the connection member 512 of the third driving motor 510 is shorter than the connection member 522 of the fourth driving motor 520 and thus the hinge 300 is moved downward.

Specifically, as the lengths of the third driving motor 510 and the fourth driving motor 520 are different from each other, a grip line G representing a height at which gripping is performed by the first finger 10 and the second finger 20 may be located above or below a center line C of the grip device 1.

The grip line G is a horizontal line corresponding to a height of the hinge 300 and may represent a point at which an object is to be gripped by the grip device 1. When the grip device 1 has a vertically symmetrical shape, the center line C may be a horizontal line that is a reference for the symmetry.

For example, when an object to be gripped is placed on a high place such as a shelf, the connection member 512 of the third driving motor 510 may operate to be longer than the connection member 522 of the fourth driving motor 520. Thus, the grip line G of the grip device 1 is higher than the center line C and thus the first finger 10 and the second finger 20 may easily grip the object on the high place without the shelf interfering.

In contrast, when an object to be gripped is placed on a low place such as a floor or a desk, the connection member 512 of the third driving motor 510 may operate to be shorter than the connection member 522 of the fourth driving motor 520. Thus, the grip line G of the grip device 1 is lower than the center line C and thus the first finger 10 and the second finger 20 may easily grip the object on the low place without, for example, a floor or a desk interfering.

That is, the grip device 1 according to an embodiment of the disclosure may move such that the lengths of the connection member 512 of the third driving motor 510 and the connection member 522 of the fourth driving motor 520 are equal to each other, and thus, the hinge 300 may be moved to a position corresponding to a shape of an object to be gripped and may easily grip the object even with a low force.

In addition, the grip device 1 according to an embodiment of the disclosure may move such that the lengths of the connection member 512 of the third driving motor 510 and the connection member 522 of the fourth driving motor 520 are different from each other, and thus, the hinge 300 may form a grip line G different from the center line C of the grip device 1 and may easily grip an object without a support, such as a shelf, a floor, or a desk, interfering.

Figure 5:
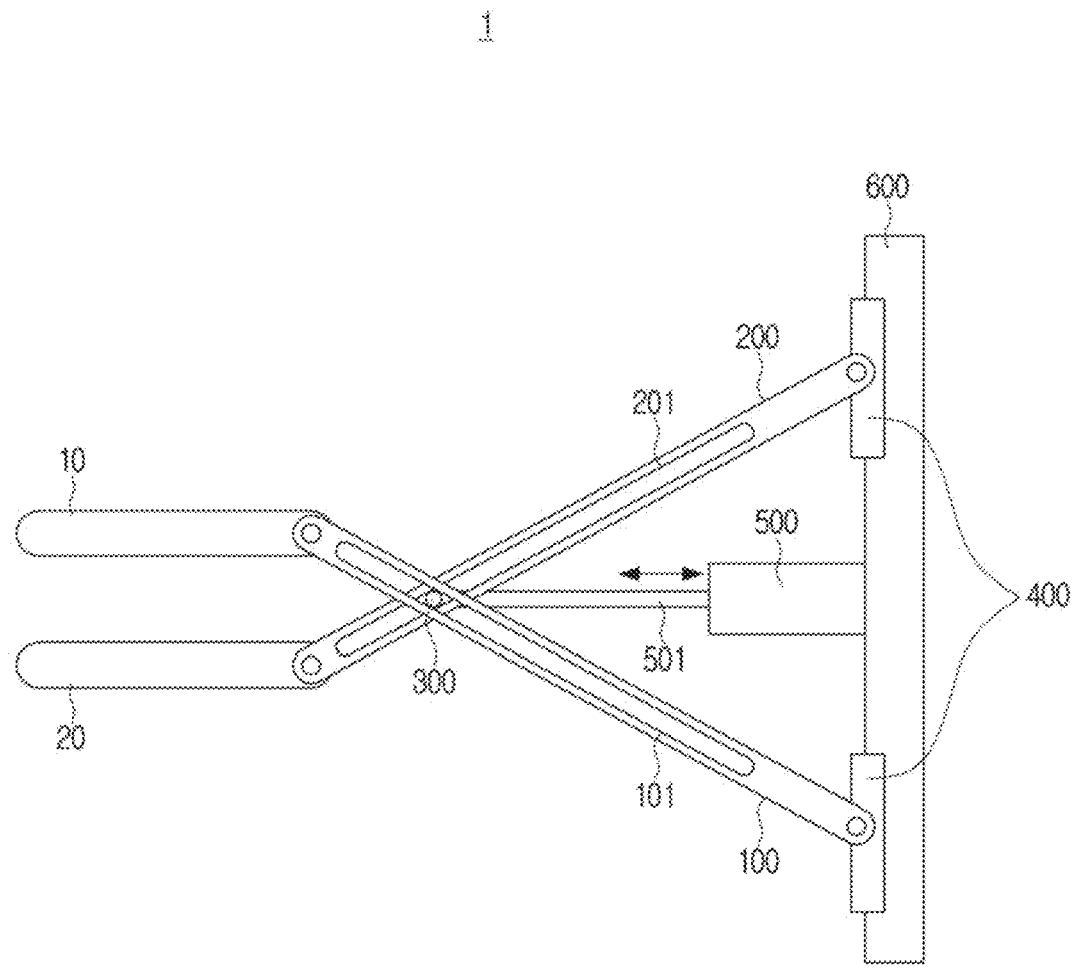
FIG. 5 is a side view of a grip device in which each of first and second link parts is configured as a single link.

FIG. 5 is a side view of a grip device in which each of first and second link parts is configured as a single link.

Referring to FIG. 5, in a grip device 1a, a first link part 100 and a second link part 200 configured to respectively support a first finger 10 and a second finger 20 may be each configured as a single link. The first link part 100 and the second link part 200 may be disposed to cross each other and connected to each other through a hinge 300. For example, the first link part 100 and the second link part 200 may have a roughly shape of scissors.

A first guide slot 101 and a second guide slot 201 may be respectively formed in the first link part 100 and the second link part 200 in a longitudinal direction. The hinge 300 may be moved within the first guide slot 101 and the second guide slot 201.

A first actuator 400 may be configured with two driving motors but the number of driving motors is not limited to two and the first actuator 400 may be configured with one driving motor and coupled to a rear end of the first link part 100 or the second link part 200.

The second actuator 500 may be configured with one driving motor and move the hinge 300. The second actuator 500 may be disposed on a support 600 to move the hinge 300 forward or backward. However, the arrangement of the second actuator 500 is not limited thereto and may be supported by the first link part 100 or the second link part 200, in a similar manner as shown in FIG. 1.

Even when the first link part 100 and the second link part 200a are each configured as a single link, the hinge 300 may be moved to a preset position to correspond to a shape of an object. Specifically, when a large grip force and a narrow gap between fingers is required to grip an object such as a dish, the hinge 300 may be moved forward to be close to the object by the second actuator 500. When a small grip force and a wide gap between the fingers are required to grip an object such as a cup, the hinge 300 may be moved backward to be away from the object by the second actuator 500.

Accordingly, even when the first actuator 400 is operated with the same driving force, the grip device 1a may efficiently grip an object with a force transmission ratio suitable for a shape of the object.

Figure 6:
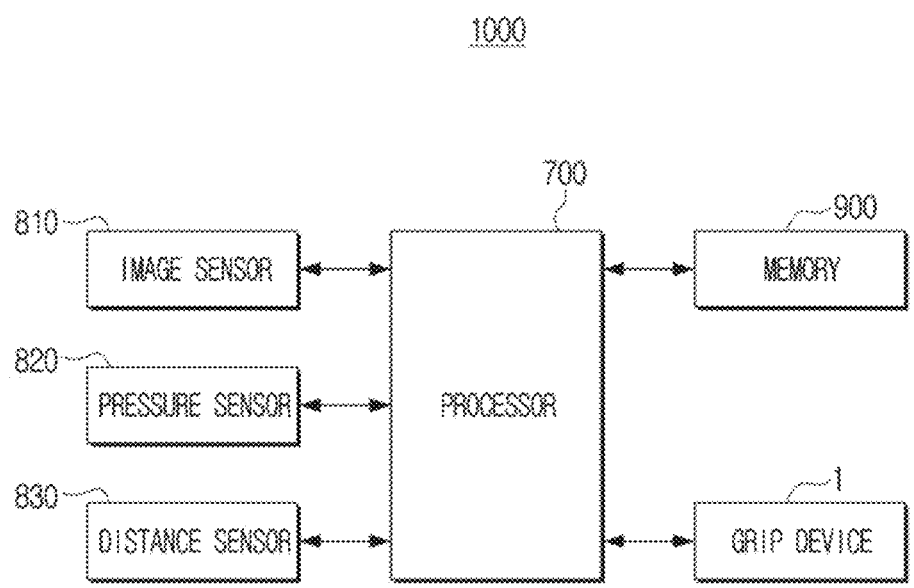
FIG. 6 is a block diagram of a robot device according to an embodiment of the disclosure.

FIG. 6 is a block diagram of a robot device according to an embodiment of the disclosure.

Referring to FIG. 6, a robot device 1000 according to an embodiment of the disclosure may include the grip device 1, a processor 700, an image sensor 810, a pressure sensor 820, a distance sensor 830, and a memory 900.

The grip device 1 may include a first finger 10, a second finger 20, and link parts (e.g., a first link part 100 and a second link part 200). The link parts may be disposed to cross each other with respect to a hinge 300 and may support the first finger 10 and the second finger 20. The grip device 1 may adjust a support point of the link parts by changing a position of the hinge 300 on the link parts.

Specifically, the link parts may include a first link part 100 and a second link part 200 disposed to cross each other with respect to the hinge 300. The first link part 100 may be provided with a first guide slot (e.g., the first guide slot 101 and/or the first guide slot 121) and may support the first finger 10. The second linkage portion 200 may be provided with a second guide slot (e.g., the second guide slot 201 and/or the second guide slot 221), disposed to cross the first link part 100, and support the second finger 20.

The hinge 300 is movable within the first guide slot and the second guide slot and may connect the first link part 100 and the second link part 200 at an intersection of the first link part 100 and the second link part 200.

The grip device 1 may further include a second actuator 500 configured to move the hinge 300 within the first guide slot 121 and the second guide slot 221. The actuator 500 may include the connection member 501, the connection member 512, and the connection member 522 connected to the hinge 300 and each having a variable length.

The link parts (e.g., the first link part 100 and the second link part 200) of the grip device 1 may be each embodied as a four-bar linkage as shown in FIG. 1 but are not limited thereto and may be each embodied as a single link as shown in FIG. 5. Parts of components of the grip device 1 that are the same as those of the above-described examples may be briefly described or a detailed description thereof may be skipped here.

The processor 700 may control overall operations of the robot device 1000. To this end, the processor 700 may include a central processing unit (CPU) or an application processor (AP). The processor 700 may be implemented as at least one general-purpose processor, a digital signal processor, an application specific integrated circuit (ASIC), a system-on-chip (SoC), a microcomputer (MICOM), a driver IC, or the like.

The image sensor 810 may detect at least one of a shape or position of an object. Specifically, the image sensor 810 may be configured to photograph objects around the robot device 1000 and may be a camera. For example, the image sensor 810 may be implemented as a three-dimensional (3D) camera or a depth camera.

The image sensor 810 may be disposed on a body part or a head part of the robot device 1000 but is not necessarily limited thereto and may be disposed on various positions, such as the first link part 100, the second link part 200, the first finger 10, and the second finger 20, on the grip device 1.

The pressure sensor 820 may measure pressure applied to at least one of the first finger 10 and the second finger 20. For example, the pressure sensor 820 may include a piezoelectric element or a load cell, convert pressure applied to at least one of the first finger 10 and the second finger 20 into an electrical signal and transmit the electrical signal to the processor 700.

The pressure sensor 820 may be disposed on a surface of the first finger 10 and a surface of the second finger 20 that face each other. Two of the pressure sensor 820 may be provided and disposed on both the first finger 10 and the second finger 20 or one pressure sensor 820 may be provided and disposed on the first finger 10 or the second finger 20.

When the grip device 1 grips an object, the pressure sensor 820 may detect pressure applied to the first finger 10 and the second finger 20 by the object, convert the pressure into an electrical signal, and transmit the electrical signal to the processor 700.

The distance sensor 830 may detect a distance to an object. Specifically, the distance sensor 830 may be embodied as a time-of-flight (ToF) sensor that includes a light-emitting part and a light-receiving part and that detects a distance between the distance sensor 830 and an object on the basis of a time required for light emitted from the light-emitting part to be reflected from the object and received by the light-receiving part.

For example, the distance sensor 830 may be implemented as an infrared sensor that detects a distance to an object on the basis of a time required for an infrared ray to be reflected from the object and received after the infrared ray is emitted. However, the type of the distance sensor 830 is not necessarily limited thereto and may be embodied as various types of sensors, such as an ultrasonic sensor or a light wave detection and ranging (LiDAR) sensor, which are capable of detecting a distance to an object. In addition, the ToF sensor is only an example, and a type of a sensor of embodiments of the disclosure is not limited as long as it is capable of detecting a distance to an object.

A control process of the robot device 1000 using the distance sensor 830 will be described in detail with reference to FIGS. 7A to 7F below.

The memory 900 may store an operating system (OS) for controlling overall operations of the components of the robot device 1000, and instructions or data related to the components in the memory 900.

Accordingly, the processor 700 may control a number of hardware or software components of the robot device 1000 by using various instructions or data stored in the memory 900, process a command or data received from at least one of the other components by loading the command or data into a volatile memory, and store various types of data in a nonvolatile memory.

In particular, the memory 900 may store information about the shapes of various objects, a critical pressure value applied to the first finger 10 and the second finger 20 due to an object to be gripped, and the sum of distances detected by the distance sensor 830 at each point at which the grip device 1 is located.

The processor 700 may receive and analyze information about the shape and position of an object detected by the image sensor 810 to identify the position, size, shape, and type of the object. Specifically, the processor 700 may identify the object through an object recognition algorithm to identify the size, shape, type, etc. of the object, and identify the position of the object on the basis of depth information of the object.

Hereinafter, a control process of the robot device 1000 using the image sensor 810 according to an embodiment of the disclosure will be described in detail.

The image sensor 810 may detect the position and shape of an object to be gripped and transmit information about the detected position and shape to the processor 700. The processor 700 compares the information received from the image sensor 810 with the information about the shapes of various objects stored in the memory 900 to identify the type and position of the object.

Thereafter, the processor 700 may control the grip device 1 to position the hinge 300 to correspond to the object detected by the image sensor 810. Specifically, the processor 700 may determine lengths of the connection member 501, the connection member 512, and the connection member 522 according to at least one of the shape or position of the object detected by the image sensor 810, and control the actuator 500 such that the connection member 501, the connection member 512, and the connection member 522 have the determined length.

For example, when the processor 700 identifies that an object to be gripped has a flat shape similar to a shape of a dish, the processor 700 may control the actuator 500 to increase the lengths of the connection member 501, the connection member 512, and the connection member 522. Accordingly, with reference to FIG. 1, the hinge 300 is moved close to the object and thus the grip device 1 may easily grip even a flat object with a high force transmission ratio while reducing the gap L2 between the first finger 10 and the second finger 20.

When the processor 700 identifies an object to be gripped as a tall object such as a cup, the processor 700 may control the actuator 500 to reduce the lengths of the connection member 501, the connection member 512, and the connection member 522. Accordingly, with reference to FIG. 2, the hinge 300 is moved away from the object and thus the grip device 1 may easily grip even a tall object with a low force transmission ratio while increasing the gap L2 between the first finger 10 and the second finger 20.

That is, the robot device 1000 according to an embodiment of the disclosure is capable of moving the hinge 300, which functions as a support point, close to or away from an object through a control process of the image sensor 810 and the processor 700 even when the same driving source is used. Accordingly, the robot device 1000 is capable of effectively gripping objects of various shapes by changing the gap L2 between the first finger 10 and the second finger 20 and a force transmission ratio according to the shapes of the objects.

When the processor 700 identifies that an object to be gripped is located above or below a center line C of the grip device 1, the processor 700 may control the actuator 500 such that lengths of the connection member 512 of the third driving motor 510 and the connection member 522 of the fourth driving motor 520 are different from each other.

Specifically, when the object is located above the center line C of the grip device 1, the processor 700 may control the actuator 500 such that the connection member 512 of the third driving motor 510 is longer than the connection member 522 of the fourth driving motor 520 as shown in FIG. 3.

In contrast, when the object is located below the center line C of the grip device 1, the processor 700 may control the actuator 500 such that the connection member 512 of the third driving motor 510 is shorter than the connection member 522 of the fourth driving motor 520 as shown in FIG. 4.

Accordingly, the grip device 1 is capable of easily performing a grip operation in a wide range without interfering with a support, such as a shelf, a floor, or a desk, with respect to a grip line G with a height different from that of the center line C.

Hereinafter, a control process of the robot device 1000 using the pressure sensor 820 according to an embodiment of the disclosure will be described in detail.

When an object to be gripped is positioned between the first finger 10 and the second finger 20, the grip device 1 may perform a grip operation by the first actuator 400. In this process, pressure may be applied to the first finger 10 and the second finger 20 by the object, and the pressure sensor 820 may measure a pressure value.

The processor 700 may control the grip operation of the grip device 1 on the basis of the pressure value measured by the pressure sensor 820. Specifically, the processor 700 may compare the pressure value measured by the pressure sensor 820 with a critical pressure value stored in the memory 900 and control an operation of the first actuator 400 to be stopped when the measured pressure value reaches the critical pressure value. According to embodiments, the processor 700 may compare the pressure value measured by the pressure sensor 820 with a plurality of pressure values stored in the memory 900. For example, the plurality of pressure values may include a minimum pressure value and a maximum pressure value, and the processor 700 may control an operation of the first actuator 400 to reduce a gripping force when the measured pressure value is above the maximum value and to increase a gripping force when the measured pressure value is below the minimum value.

Accordingly, the robot device 1000 according to an embodiment of the disclosure may prevent an object from being broken due to excessively high pressure or from slipping from the grip device 1 due to excessively low pressure, and may stably grip the object with an appropriate grip force.

A process in which an operation of the grip device 1 is controlled according to a result of detection of the distance sensor 830 will be described in detail with reference to FIGS. 7A to 7F below. FIGS. 7A to 7F are diagrams for describing a process in which a grip operation of the grip device 1 is controlled according to a measurement value of the distance sensor 830.

Referring to FIGS. 7A to 7F, the distance sensor 830 may further include a first distance sensor 831 on the first finger 10 and a second distance sensor 832 on the second finger 20.

When the first distance sensor 831 detects an object S during the movement of the robot device 1000, the processor 700 may activate the second distance sensor 832, receive information about distances to the object S detected by the first distance sensor 831 and the second distance sensor 832 at multiple points according to the movement of the robot device 1000, and control the grip operation of the grip device 1 on the basis of the received information.

Figure 7A:
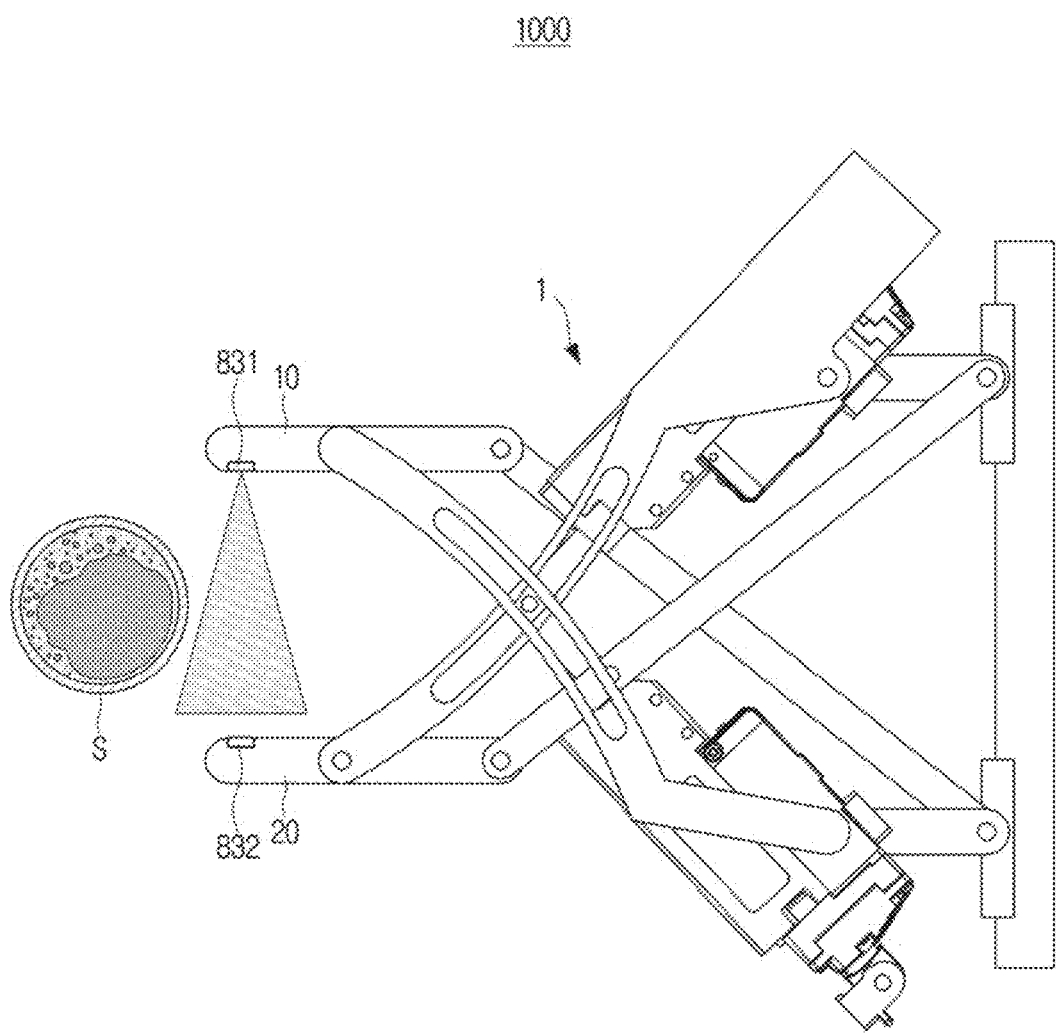
FIG. 7A is a first diagram for describing a process in which a grip operation of a grip device is controlled according to a value measured by a distance sensor.

Specifically, as shown in FIG. 7A, during the movement of the robot device 1000 toward the object S to be gripped, the first distance sensor 831 may detect the object S in an activated state and the second distance sensor 832 may be in a deactivated state until the object S is detected by the first distance sensor 831.

Accordingly, the robot device 1000 according to an embodiment of the disclosure may remove an optical interference effect that may occur when no object is located between the first finger 10 and the second finger 20, and may minimize power consumption and prevent load on the processor 700 by activating only the first distance sensor 831.

Figure 7B:
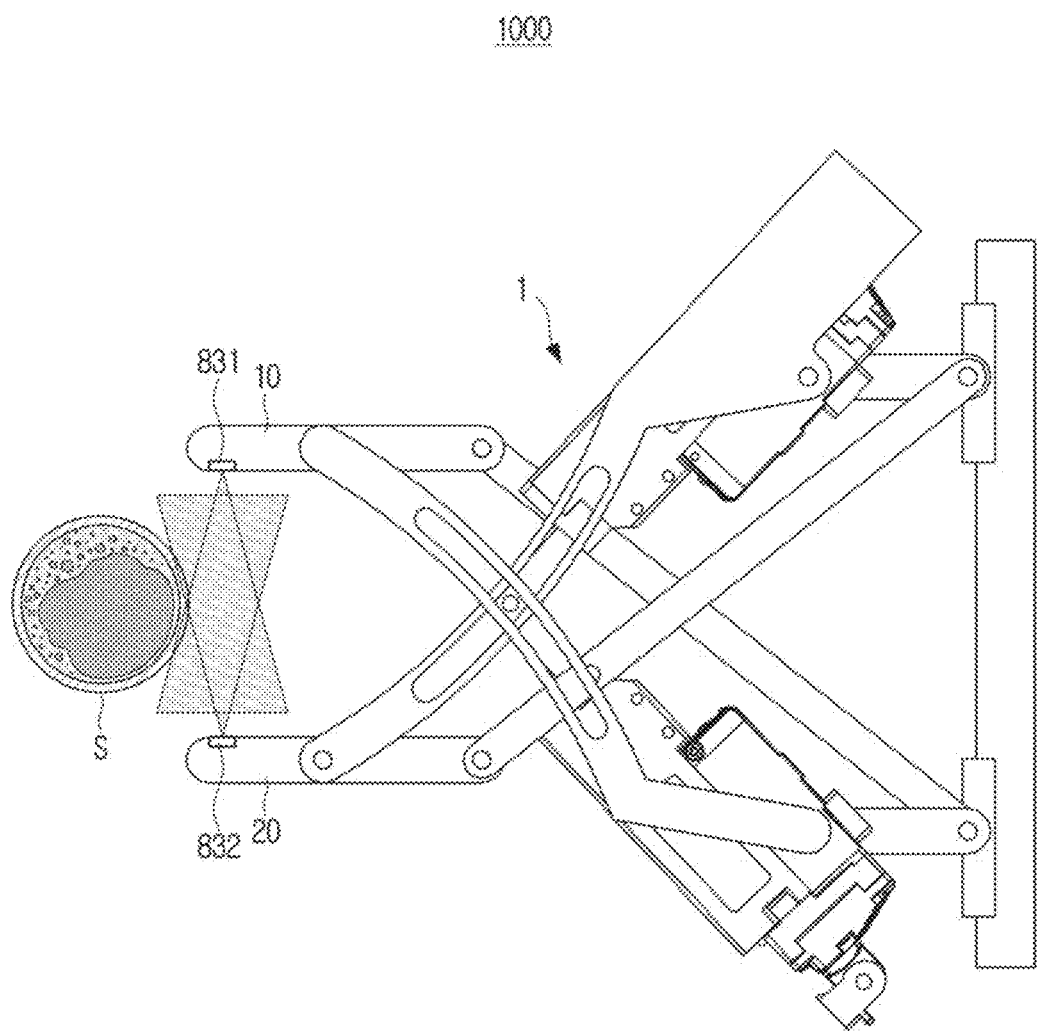
FIG. 7B is a second diagram for describing the process in which the grip operation of the grip device is controlled according to the value measured by the distance sensor.

Thereafter, as shown in FIG. 7B, when the first distance sensor 831 detects an object, the processor 160 may activate the second distance sensor 832. Accordingly, the processor 700 may receive information about distances to the object S to be gripped from the first distance sensor 831 and the second distance sensor 832.

In addition, the processor 700 may determine whether the difference between the distance between the first distance sensor 831 and the object S and the distance between the second distance sensor 832 and the object S is greater than a threshold value. Specifically, when it is determined that the difference is greater than the threshold value, the processor 700 may control at least one of the first finger 10 and the second finger 20 such that the difference value is equal to or less than the threshold value.

For example, when the threshold value is set to 0, the processor 700 may control at least one of the first finger 10 and the second finger 20 such that the distance between the first distance sensor 831 and the object S is equal to the distance between the second distance sensor 832 and the object S.

Accordingly, when the grip device 1 grips the object S, the first finger 10 and the second finger 20 may simultaneously approach the object S at the same speed to stably grip the object S.

Figure 7C:
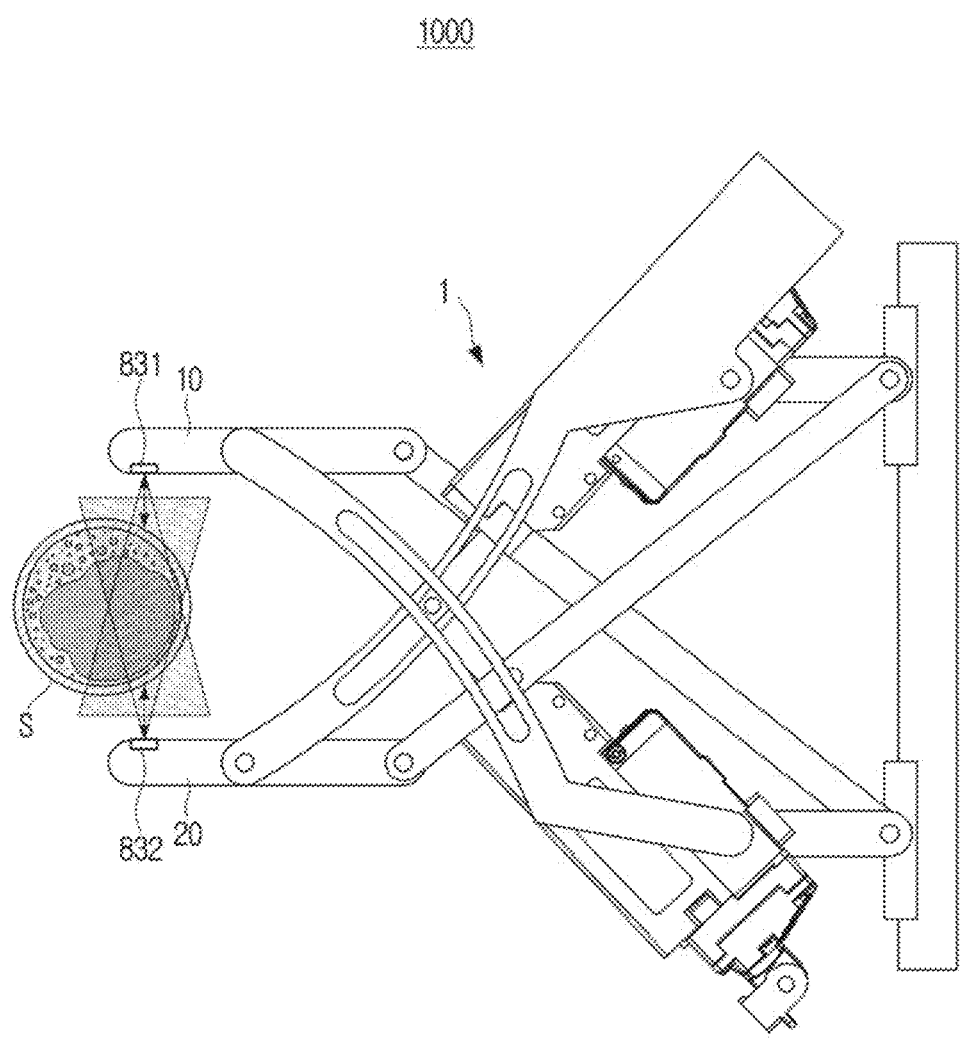
FIG. 7C is a third diagram for describing the process in which the grip operation of the grip device is controlled according to the value measured by the distance sensor.
Figure 7D:
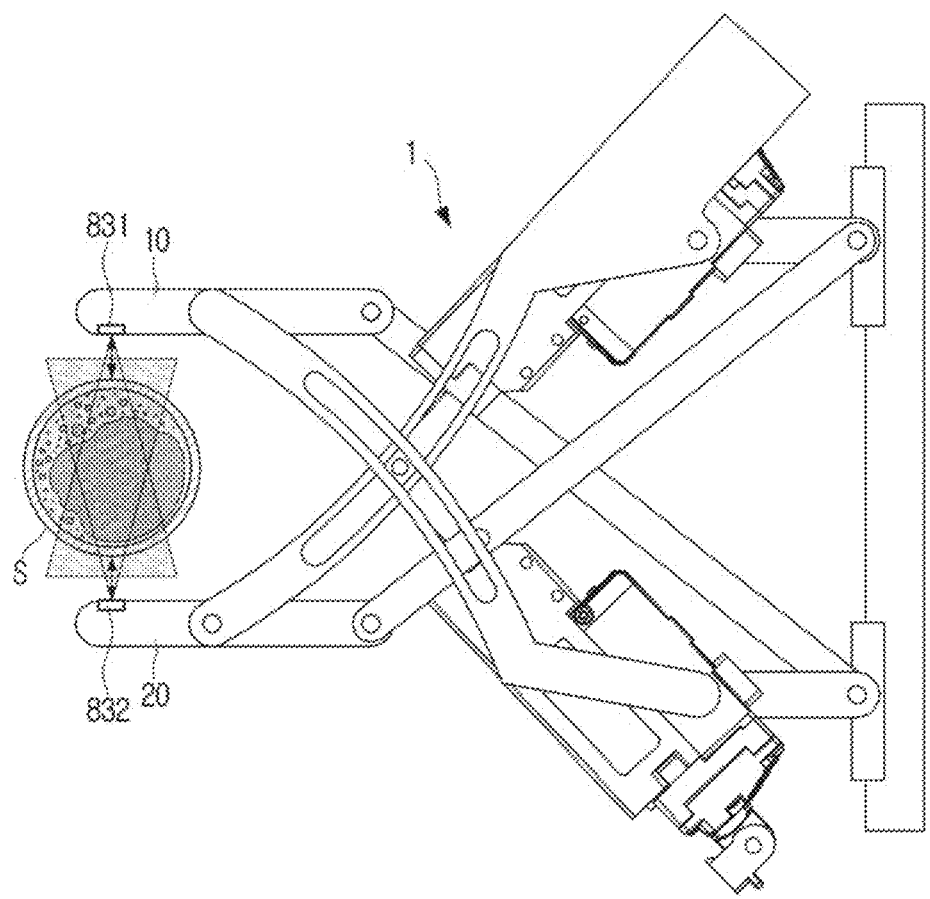
FIG. 7D is a fourth diagram for describing the process in which the grip operation of the grip device is controlled according to the value measured by the distance sensor.
Figure 7E:
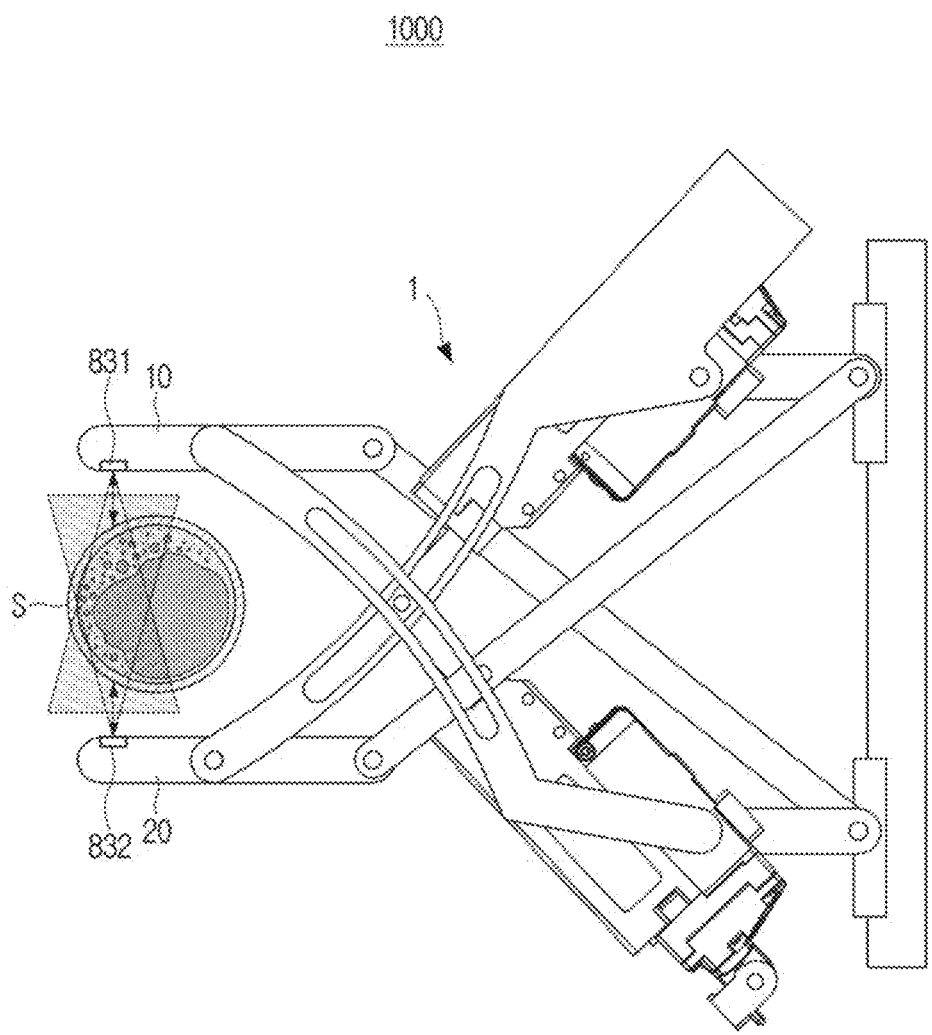
FIG. 7E is a fifth diagram for describing the process in which the grip operation of the grip device is controlled according to the value measured by the distance sensor.

Thereafter, as shown in FIGS. 7C, 7D, and 7E, the robot device 1000 may continuously move in a direction toward the object S. The processor 700 may sequentially receive information regarding distances to the object S from the first distance sensor 831 and the second distance sensor 832 during the movement of the robot device 1000.

In this case, the processor 700 may determine a point at which the distance to the object S is at a minimum on the basis of the information about the distances received from the first distance sensor 831 and the second distance sensor 832. When distance values received from the first distance sensor 831 and the second distance sensor 832 at multiple points decrease sequentially, the processor 700 may continuously move the robot device 1000 in the direction toward the object S.

When distances values received from the first distance sensor 831 and the second distance sensor 832 decrease sequentially but increase at a point, the processor 700 may determine a point immediately before the point as a point at which a distance to the object S is at a minimum, and control the robot device 1000 to return to the point at which the distance to the object S is at a minimum.

Figure 7F:
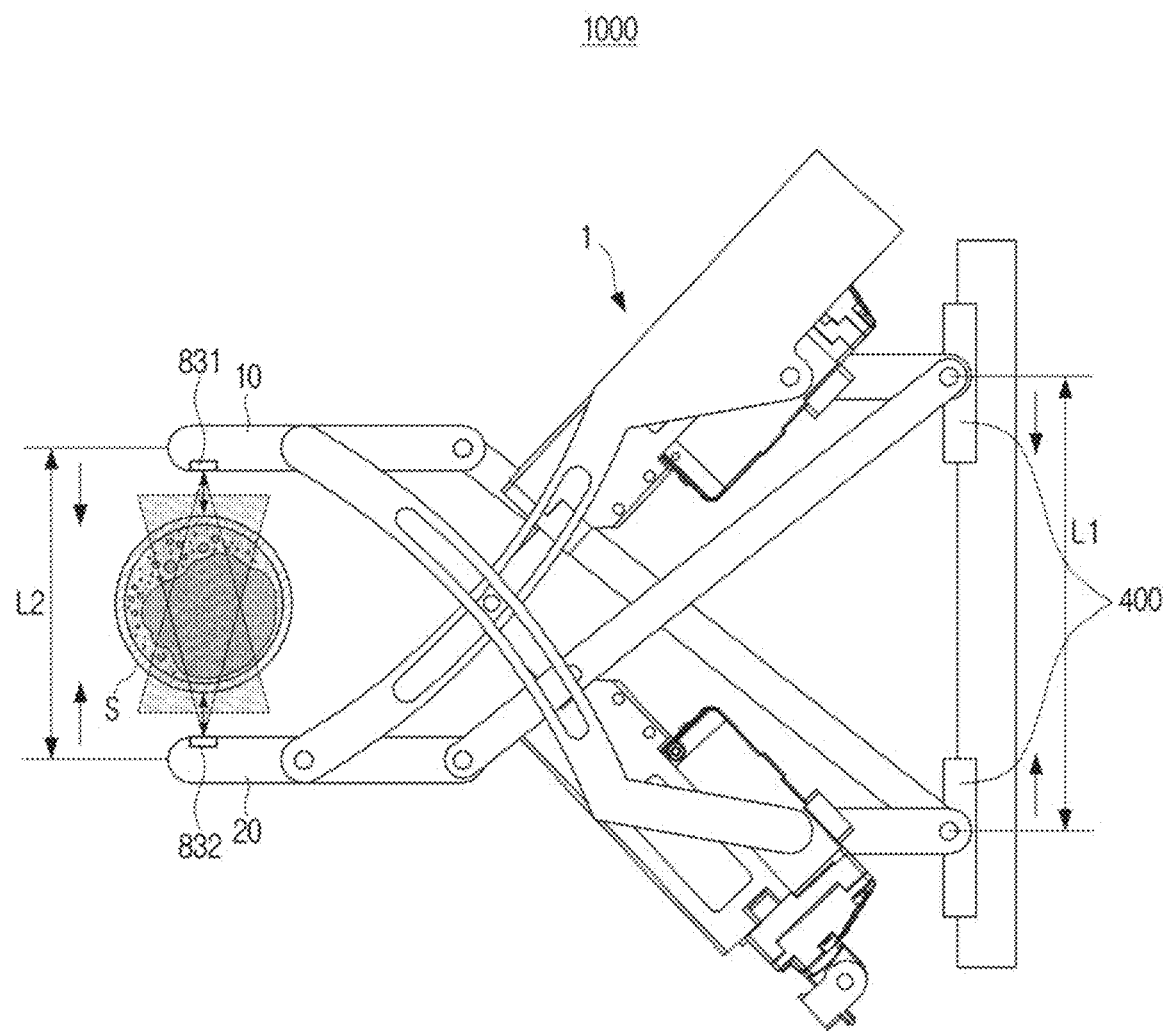
FIG. 7F is a sixth diagram for describing the process in which the grip operation of the grip device is controlled according to the value measured by the distance sensor.

As shown in FIG. 7F, when the grip device 1 is located at a point at which the distances between the first distance sensor 831 and the object S and the second distance sensor 832 and the object S are at a minimum, the processor 700 may control the first actuator 400 to cause the grip device 1 to grip the object S. Specifically, the grip device 1 may grip the object S as a gap L1 between two driving motors of the first actuator 400 and a gap L2 between the first finger 10 and the second finger 20 are controlled to be small.

In this way, the robot device 1000 of the disclosure may grip a central part or a thickest part of the object S by gripping the object S at a point at which the distance between the first distance sensor 831 and the object S is at a minimum or at a point at which the distance between the second distance sensor 832 and the object S is at a minimum. Accordingly, the robot device 1000 of the disclosure is capable of stably gripping the object S and may prevent the object S from falling or being broken caused when edges of the object S are gripped.

Although example embodiments of the disclosure have been illustrated and described herein, it should be understood that the disclosure is not limited thereto, and various modifications may be made by those of ordinary skill in the art without departing from scope of the present disclosure.

The invention claimed is:

1. A grip device comprising:
a first finger;
a second finger facing the first finger;
a first link part comprising a first guide slot and configured to support the first finger;
a second link part comprising a second guide slot, the second link part crossing the first link part and configured to support the second finger;
a hinge configured to be moved within the first guide slot and the second guide slot and connect the first link part and the second link part at an intersection of the first link part and the second link part;
a first actuator configured to move at least one of the first link part and the second link part to adjust a gap between the first finger and the second finger; and
a second actuator configured to move the hinge within the first guide slot and the second guide slot.

2. The grip device as claimed in claim 1, wherein
the first link part further comprises:
a first linkage connected to a first point on the first finger;
a second linkage connected to a second point on the first finger; and
a third linkage connected to the second linkage and provided in parallel with the first finger,
the second link part comprises:
a fourth linkage connected to a first point on the second finger;
a fifth linkage connected to a second point on the second finger and provided in parallel with the fourth linkage; and
a sixth linkage connected to the fifth linkage and provided in parallel with the second finger, and
the first guide slot is formed in the second linkage, and the second guide slot is formed in the fifth linkage.

3. The grip device as claimed in claim 2, wherein a length of the third linkage is equal to a distance between the first point and the second point on the first finger, and
a length of the sixth linkage is equal to a distance between the first point and the second point on the second finger.

4. The grip device as claimed in claim 3, wherein the first actuator is configured to adjust a gap between the third linkage and the sixth linkage.

5. The grip device as claimed in claim 4, wherein the first actuator comprises:
a first driving motor configured to move the third linkage in a first direction; and
a second driving motor configured to move the sixth linkage in a second direction opposite to the first direction.

6. The grip device as claimed in claim 2, wherein the second actuator comprises:
a first driving motor provided on the second linkage and configured to move the hinge along the first guide slot; and
a second driving motor provided on the fifth linkage and configured to move the hinge along the second guide slot.

7. The grip device as claimed in claim 6, wherein each of the first driving motor and the second driving motor comprises a Scotch yoke type driving motor, a rack and pinion type driving motor, or a hydraulic type driving motor.

8. The grip device as claimed in claim 2, wherein the second linkage and the fifth linkage each have a convex shape with respect to a space between the first finger and the second finger.

9. The grip device as claimed in claim 1, wherein the second actuator comprises a driving motor configured to move the hinge within the first guide slot and the second guide slot.

* * * * *